United States Patent
Bhagavatula et al.

(10) Patent No.: US 6,510,264 B2
(45) Date of Patent: Jan. 21, 2003

(54) BULK INTERNAL BRAGG GRATINGS AND OPTICAL DEVICES

(75) Inventors: Venkata A. Bhagavatula, Big Flats, NY (US); Nicholas F. Borrelli, Elmira, NY (US); Monica K. Davis, Belmont, MA (US); Edward F. Murphy, Hammondsport, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/874,721

(22) Filed: Jun. 5, 2001

(65) Prior Publication Data

US 2002/0015546 A1 Feb. 7, 2002

Related U.S. Application Data

(60) Provisional application No. 60/221,811, filed on Jul. 31, 2000, and provisional application No. 60/221,770, filed on Jul. 31, 2000.

(51) Int. Cl.[7] .............................. G02B 6/34; G02B 6/28
(52) U.S. Cl. .............................. 385/37; 385/14; 385/24
(58) Field of Search ................................ 385/14–24, 37, 385/129–132; 359/115, 117, 129–134

(56) References Cited

U.S. PATENT DOCUMENTS 2,059,640 A   11/1936   Hood .......................... 176/122

(List continued on next page.)

FOREIGN PATENT DOCUMENTS

| CA | 354533 | 4/1935 |
| GB | 263410 | 12/1926 |
| GB | 298908 | 1/1930 |
| GB | 319337 | 2/1930 |

OTHER PUBLICATIONS

Glass Color Filters, Corning Glass Works, Optical Sales Dept., Corning, NY, 1948, pp 1–22.

Glass Color Filters, Corning Glass Works, Price List, Optical Sales Dept., Corning, NY, May 1, 1954, pp. 1–3.

New Ultra–violet Transmitting Glass, H.P. Hood, Science 64, 281–282, 1926.

*Primary Examiner*—Akm E. Ullah
*Assistant Examiner*—Michelle R. Connelly-Cushwa
(74) *Attorney, Agent, or Firm*—Edward F. Murphy

(57) ABSTRACT

The present invention provides photonic devices utilized in optical telecommunications. The photonic devices include photosensitive bulk glass bodies which contain Bragg gratings, particularly with the ultraviolet photosensitive bulk glass bodies directing optical telecommunications wavelength range bands. Preferably the ultraviolet photosensitive bulk glass bodies are batch meltable alkali boro-aluminosilicate bulk glass bodies. The invention includes an optical communications wavelength device for use with wavelength range bands, with the device comprising an input optical waveguide collimator for collimating an input light beam out of an optical waveguide to provide an unguided input light beam including at least one reflective wavelength range band $\lambda_R$ and at least one wavelengths range band $\lambda_n$; an internal bulk Bragg grating including a transparent photosensitive bulk optical grating medium with an internal modulated refractive index grating with a grating pattern for reflecting the at least one wavelength range band $\lambda_R$; at least one output coupler for outputting an at least one output wavelength range band; and a substrate structure for securing said bulk Bragg grating relative to the input collimator and the output coupler, with the bulk Bragg grating disposed in the unguided input light beam wherein the at least one wavelengths range band $\lambda_n$ is transmitted through the bulk Bragg grating and the at least one wavelength range band $\lambda_R$ is reflected by the bulk Bragg grating.

13 Claims, 17 Drawing Sheets

U.S. PATENT DOCUMENTS

| | | | |
|---|---|---|---|
| 2,069,713 A | 2/1937 | Braselton | 250/35 |
| 2,382,056 A | 8/1945 | Hood | 106/54 |
| 3,978,272 A * | 8/1976 | Donley | 126/908 |
| 4,094,689 A * | 6/1978 | van Ass et al. | 385/141 |
| 4,097,258 A * | 6/1978 | Horikawa et al. | 385/125 |
| 4,390,638 A * | 6/1983 | Mennemann et al. | 501/75 |
| 4,740,951 A * | 4/1988 | Lizet et al. | 359/130 |
| 5,136,677 A | 8/1992 | Drexhage et al. | 385/123 |
| 5,327,515 A | 7/1994 | Anderson et al. | 385/123 |
| 5,367,588 A | 11/1994 | Hill et al. | 385/37 |
| 5,495,548 A | 2/1996 | Bilodeau et al. | 385/123 |
| 5,550,654 A | 8/1996 | Erdogan et al. | 359/3 |
| 5,668,901 A | 9/1997 | Keck et al. | 385/37 |
| 5,768,450 A | 6/1998 | Bhagavatula | 385/24 |
| 5,818,986 A * | 10/1998 | Asawa et al. | 385/14 |
| 5,881,186 A * | 3/1999 | Starodubov | 359/566 |
| 5,937,120 A * | 8/1999 | Higashi | 372/102 |
| 5,949,934 A * | 9/1999 | Shima et al. | 385/128 |
| 5,953,471 A * | 9/1999 | Espindola et al. | 385/37 |
| 6,075,625 A * | 6/2000 | Ainslie et al. | 359/3 |
| 6,178,045 B1 | 1/2001 | Cook et al. | 359/559 |
| 6,201,918 B1 | 3/2001 | Berkey et al. | 385/128 |
| 6,221,566 B1 * | 4/2001 | Kohnke et al. | 385/123 |
| 6,229,945 B1 | 5/2001 | Ainslie et al. | 385/123 |
| 6,233,381 B1 | 5/2001 | Borrelli et al. | 385/37 |
| 6,271,160 B1 | 8/2001 | Yamamotot et al. | 501/42 |

* cited by examiner

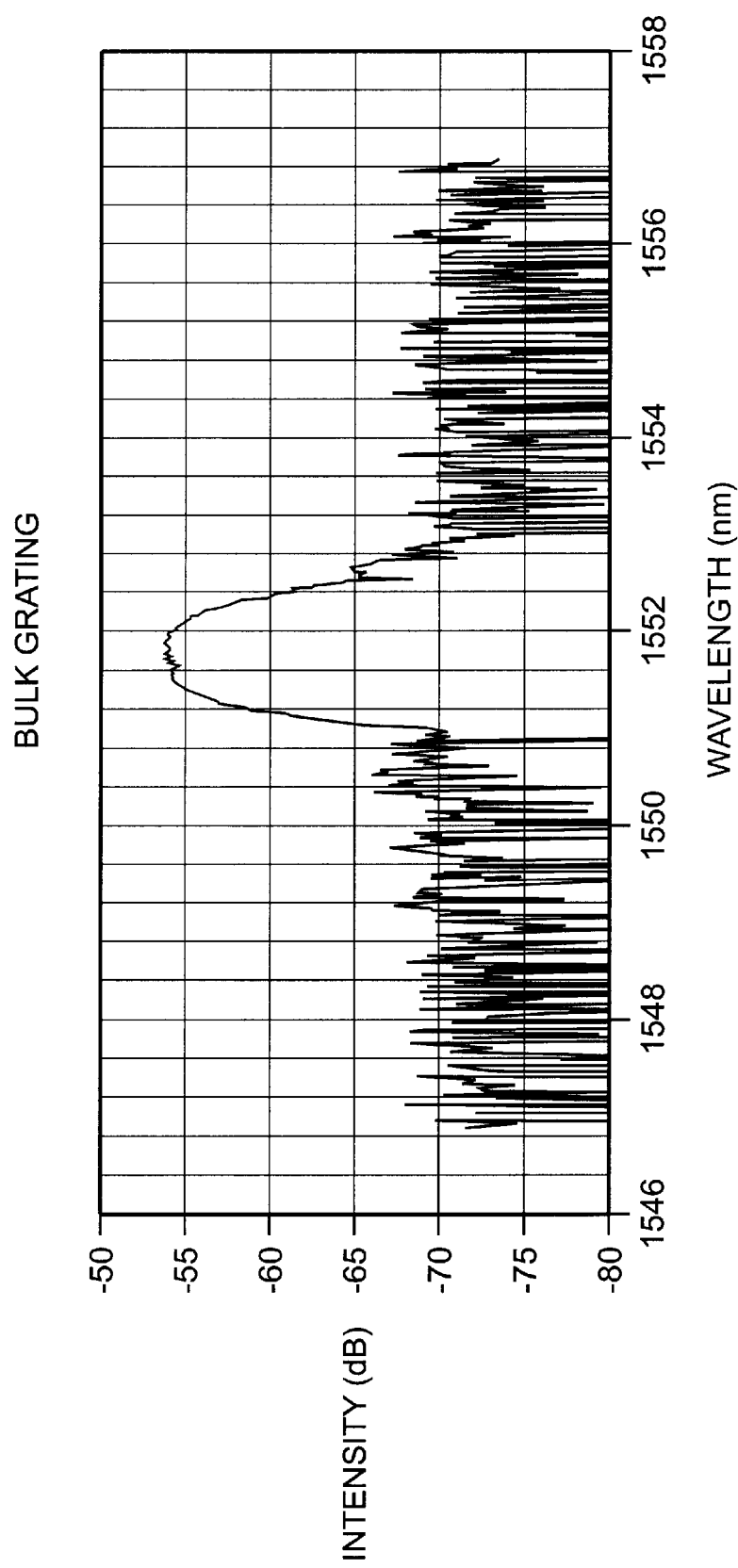
FIG. 21 BULK BRAGG GRATING CHARACTERIZATION IN REFLECTION

BULK INTERNAL BRAGG GRATINGS AND OPTICAL DEVICES

CROSS-REFERENCE TO RELATED PATENT APPLICATIONS

This application claims the benefit of U.S. Provisional Application, No. 60/221,770 filed Jul. 31, 2000, entitled BULK INTERNAL BRAGG GRATINGS AND OPTICAL DEVICES, of Venkata A. Bhagavatula, Nicholas F. Borrelli, Monica K. Davis and Edward F. Murphy, III, which is hereby incorporated by reference.

This application is related to co-filed U.S. Application Serial No. 60/221,811, filed Jul. 31, 2000, entitled UV Photosensitive Melted Germano-Silicate Glass, by Nicholas F. Borrelli, George B. Hares and Charlene M. Smith, which is hereby incorporated by reference.

BACKGROUND OF THE INVENTION

The present invention relates generally to photonic devices utilized in optical telecommunications, and in particular photonic devices utilizing photosensitive bulk glass bodies which contain Bragg gratings. In particular photonic devices for directing wavelength range bands are provided from ultraviolet photosensitive bulk glass bodies, and preferably from batch meltable alkali boro-alumino-silicate bulk glass bodies.

Optical refractive index Bragg grating patterns formed in bulk glass bodies are utilzed to reflect optical telecommunication wavelengths of light. Such bulk internal Bragg grating devices provide economic and manufacturing benefits for the production of optical telecommunication photonic devices.

SUMMARY OF THE INVENTION

The invention includes an optical communications wavelength device for use with wavelength range bands, said device comprising an input optical waveguide collimator, said input optical waveguide collimator collimating an input light beam out of an optical waveguide to provide an unguided input light beam including at least one reflective communications wavelength range band $\lambda_R$ and at least one communications wavelengths range band $\lambda_n$ preferably including $\lambda_{n1}$, $\lambda_{n2}$, $\lambda_{n3}$ and $\lambda_{n4}$, a bulk non-waveguiding, internal Bragg grating, said bulk Bragg grating comprised of a transparent photosensitive bulk optical grating medium including an internal modulated refractive index grating with a grating pattern period for reflecting said at least one wavelength range band $\lambda_R$, at least one output coupler, said output coupler for outputting at least one output wavelength range band, and a substrate structure for securing said bulk Bragg grating relative to said input collimator and said output coupler, said bulk Bragg grating disposed in said unguided input light beam wherein said at least one wavelengths range band $\lambda_n$ is transmitted through said bulk Bragg grating and said at least one wavelength range band $\lambda_R$ is reflected by said bulk Bragg grating.

The invention further includes a method of making an optical communications wavelength device, said method comprising providing an input optical waveguide collimator for producing a collimated unguided input light beam path, providing a bulk internal Bragg grating in a transparent photosensitive bulk optical grating medium, providing a reflected wavelength output coupler and a transmitted wavelength output coupler, securely disposing said provided bulk internal Bragg grating relative to said input optical waveguide collimator, said reflected wavelength output coupler, said transmitted wavelength output coupler, and in the collimated unguided input light beam path wherein a reflected wavelength is reflected by said bulk internal Bragg grating to said reflected wavelength output coupler and a transmitted wavelength is transmitted through said bulk internal Bragg grating and to said transmitted wavelength output coupler.

The invention further includes an optical communications planar integrated waveguide circuit device for operating on communications wavelengths including at least one reflectable wavelength, said device comprising a planar waveguide substrate supporting a waveguiding integrated circuit core and a waveguiding integrated circuit cladding covering said core, said planar waveguide substrate comprised of a transparent photosensitive bulk optical grating medium, said transparent photosensitive bulk optical grating medium containing within it a bulk Bragg internal modulated refractive index grating with a grating pattern for reflecting at least one reflectable wavelength, said refractive index grating proximate adjacent said core wherein a reflectable wavelength guided by said core is reflected by said refractive index grating.

The invention further includes a method of making an optical planar integrated waveguide circuit, said method comprising providing a transparent photosensitive bulk optical grating medium planar waveguide substrate having a near core side, forming a waveguiding integrated circuit core, cladding said core, forming a bulk Bragg internal modulated refractive index grating in said transparent photosensitive bulk optical grating medium planar waveguide substrate proximate said near core side wherein a waveguided wavelength guided by said core is reflected manipulated by said refractive index grating.

The invention further includes an optical waveguide semiconductor laser device for an optical waveguide communications system, said device comprising an optical waveguide system semiconductor laser for producing a reflectable wavelength $\lambda_R$ utilized in an optical waveguide system, preferably a pump or signal laser a bulk internal Bragg laser grating, said bulk Bragg laser grating comprised of a transparent photosensitive bulk optical grating medium including an internal modulated refractive index grating with a grating period for reflecting said wavelength $\lambda_R$, a substrate structure for securing said bulk Bragg laser grating relative to said semiconductor laser wherein said wavelength $\lambda_R$ produced by said semiconductor laser is reflected by said bulk internal Bragg laser grating back into said semiconductor laser. Preferably semiconductor laser device comprises a signal laser or a pump laser.

The invention further includes a method of making an optical waveguide semiconductor laser device, said method comprising providing a bulk internal Bragg laser grating in a transparent photosensitive bulk optical grating medium, providing an optical waveguide system semiconductor laser for producing an optical waveguide system wavelength securely disposing said bulk optical grating medium relative to said semiconductor laser wherein a wavelength produced by said semiconductor laser is reflected by said bulk internal Bragg laser grating back into said semiconductor laser.

The invention further includes an optical communications wavelength optical element for operating on light range bands, said optical element comprised of a transparent photosensitive bulk optical grating medium, preferably a photosensitive bulk glass, said optical element having at least one optical element optical surface for manipulating light, said bulk glass including an internal modulated refractive index Bragg grating pattern for reflecting at least one wavelength range band.

The invention further includes a multi-mask grating former, said grating former comprised of a first grating phase mask and an opposing second grating phase mask and a phase mask spacing structure, said phase mask spacing structure securing said first phase mask away from said second phase mask to provide a photosensitive optical grating medium receiver space for reception of a photosensitive optical grating medium between said first and second masks with said first phase mask in alignment with said second phase mask.

The invention further includes a method of making an optical waveguide communications wavelength device, said method comprising providing an input optical waveguide collimator for producing a collimated unguided input light beam path from an optical waveguide, providing a bulk internal Bragg grating in a transparent photosensitive bulk optical grating medium, providing a wavelength output waveguide coupler, securely disposing said provided bulk internal Bragg grating relative to said input optical waveguide collimator, said output coupler, and in the collimated unguided input light beam path wherein a reflected wavelength is reflected by said bulk internal Bragg grating and a transmitted wavelength is transmitted through said bulk internal Bragg grating. In an embodiment the reflected wavelength is outputted. In a further embodiment the transmitted wavelength is outputted. In a further embodiment the reflected wavelength is outputted to a first output coupler and a transmitted wavelength is outputted to a second output coupler.

BRIEF DESCRIPTION OF THE DRAWINGS

FIG. 21 shows a reflection spectrum of a grating in accordance with the invention.

DETAILED DESCRIPTION OF THE PREFERRED EMBODIMENTS

The invention includes an optical communications wavelength device for use with wavelength range bands. The communications wavelength device includes an input optical waveguide collimator for collimating an input light beam out of an optical waveguide to provide an unguided input light beam which includes at least one reflective communications wavelength range band $\lambda_R$ and at least one communications wavelength range band $\lambda_n$. The device further includes a bulk internal Bragg grating comprised of a transparent photosensitive bulk optical grating medium including an internal modulated refractive index grating with a grating pattern for reflecting the at least one wavelength range band $\lambda_R$. The device includes at least one output coupler for outputting at least one output wavelength range band. The device includes a substrate structure for securing the bulk Bragg grating relative to the input collimator and the output coupler with the bulk Bragg grating disposed in the unguided input light beam wherein the at least one wavelength range band $\lambda_n$ is transmitted through the bulk Bragg grating and the at least one wavelength range band $\lambda_R$ is reflected by the bulk Bragg grating. In a preferred embodiment the device comprises an optical communications demultiplexer/multiplexer. In a further embodiment the device comprises a gain flattening filter.

Figure 1:
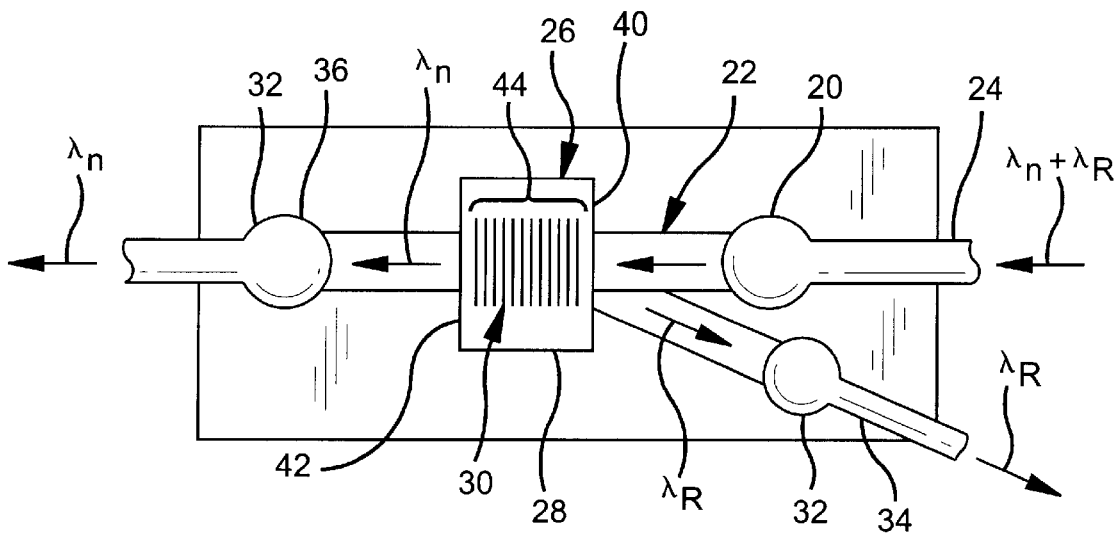
FIG. 1 shows an embodiment of the invention.
Figure 2:
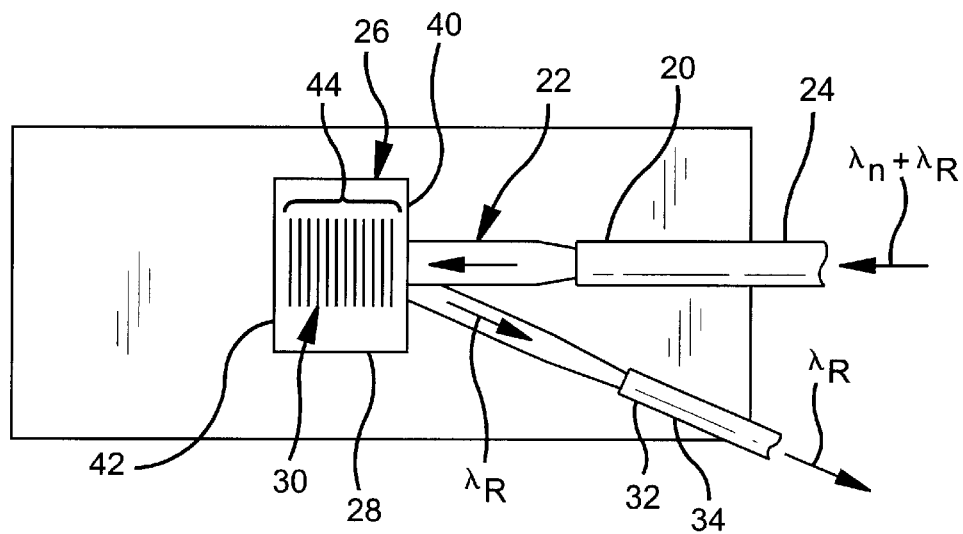
FIG. 2 shows an embodiment of the invention with a reflected output coupler utilized to output $\lambda_R$.
Figure 3:
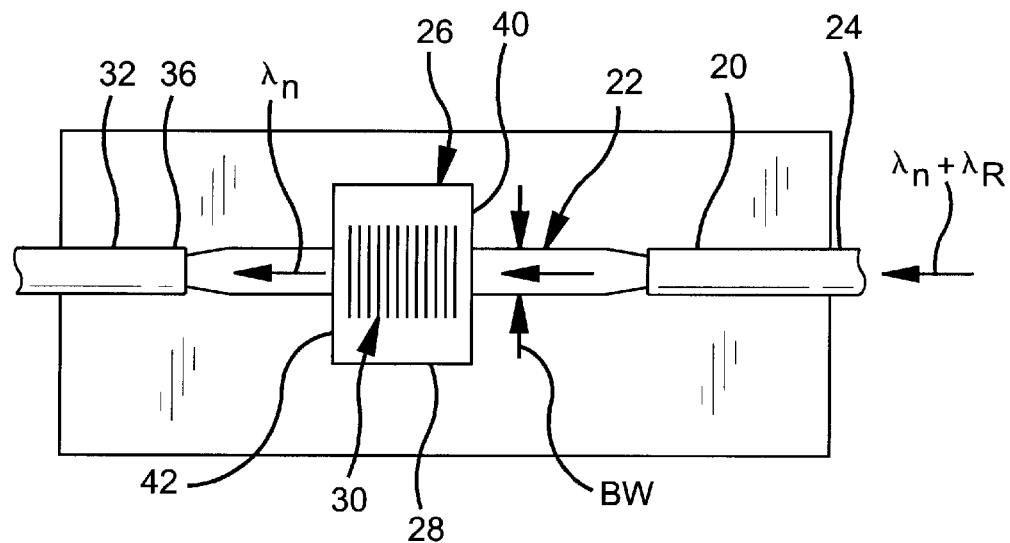
FIG. 3 shows an embodiment of the invention.

FIG. 1 shows an embodiment of the invention. Input optical waveguide collimator 20 produces input light beam 22 out of optical waveguide 24. Bulk internal Bragg grating 26 is comprised of a transparent photosensitive bulk optical grating medium 28 with an internal modulated refractive index grating 30. Output couplers 32 include reflected output wavelength range band output coupler 34 and transmitted output wavelength range band output coupler 36. Reflected output coupler 34 is disposed relative to bulk Bragg grating 26 wherein $\lambda_R$ is reflected by internal grating 30 to output coupler 34. Transmitted output coupler 36 is disposed relative to bulk Bragg grating 26 and input beam 22 wherein $\lambda_n$ is transmitted through grating 26 and into output coupler 36. FIG. 2 shows an embodiment of the invention wherein only a reflected output coupler is utilized to output $\lambda_R$. Such an embodiment can be utilized to separate $\lambda_R$ when there is no need to output the transmitted wavelengths of $\lambda_R$. A further embodiment is shown in FIG. 3 wherein the transmitted wavelengths of $\lambda_R$ are outputted and the wavelengths of $\lambda_n$ are separated out by bulk grating 26 but not outputted.

Figure 4:
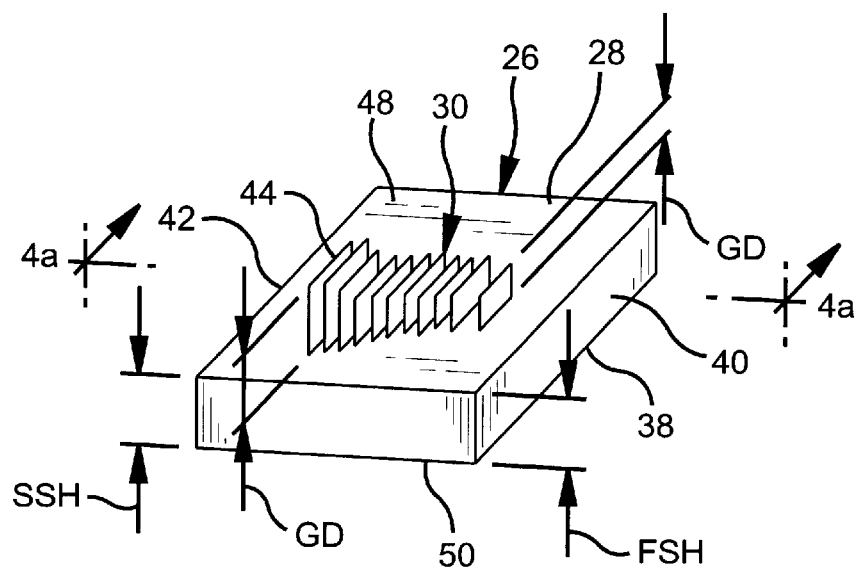
FIGS. 4 and 4a show a preferred embodiment of a bulk internal Bragg grating in accordance with the invention.
Figure 4A:
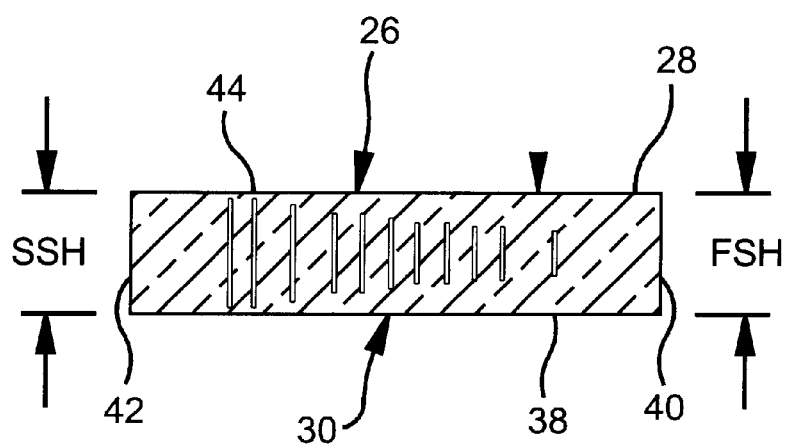

FIGS. 4 and 4a show a preferred embodiment of bulk internal Bragg grating 26. Transparent photosensitive bulk optical grating medium 28 is preferably a photosensitive bulk glass 38. Internal modulated refractive index grating pattern 30 is photo-induced formed inside photosensitive bulk glass 38 using a photo-inducing radiation grating pattern. The photo-inducing radiation grating pattern induces a change in the refractive index of the glass exposed to the radiation pattern. FIG. 4a is a cross section of FIG. 4. Preferably photosensitive bulk glass 38 has a 250 nm absorption that is less than 30 dB/cm. Preferably glass 38 has a 250 nm absorption <20 dB/cm, more preferably <15 dB/cm, more preferably <5 dB/cm. Such glass absorption's allow for beneficial grating characteristics and the formation of gratings with a radiation pattern at a UV wavelength of 250 nm or less. Preferably the bulk grating 30 in bulk glass 38 has a refractive index photosensitivity modulation level $\Delta n > 10^{-4}$. More preferably the index modulation $\Delta n > 2 \times 10^{-4}$. In a preferred embodiment photosensitive bulk glass 38 is an alkali boro-alumino-silicate glass that contains germanium and is hydrogen ($H_2$) loadable. Preferably the alkali boro-alumino-silicate glass is a melted glass, preferably with a melting temperature $\leq 1650°$ C. The bulk glass 38 is preferably a below 250 nm photosensitive alkali boro-alumino-silicate glass with $\leq 70$ mole % $SiO_2$, $\geq 25$ mole % $B_2O_3$, $\geq 2$ mole % $GeO_2$, $<10$ mole % $Al_2O_3$ and $<10$ mole % alkali. More preferably glass 38 has a composition of 42–67 mole % $SiO_2$, 2–15 mole % $GeO_2$, 25–36 mole % $B_2O_3$, 2–6 mole % $Al_2O_3$ and 2–6 mole % $R_2O$ where R is an alkali.

Figure 5:
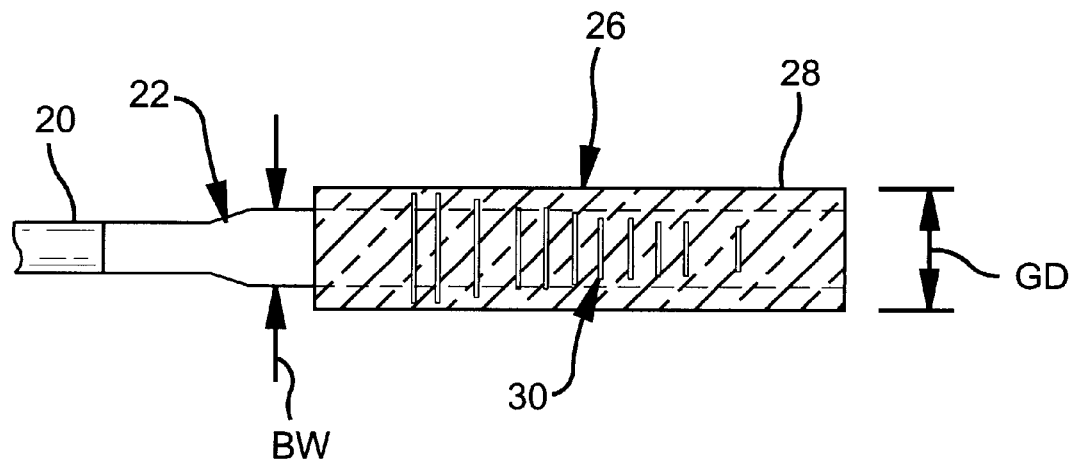
FIG. 5 shows an embodiment of the invention with an unguided input light beam with a collimated beam width BW.
Figure 6:
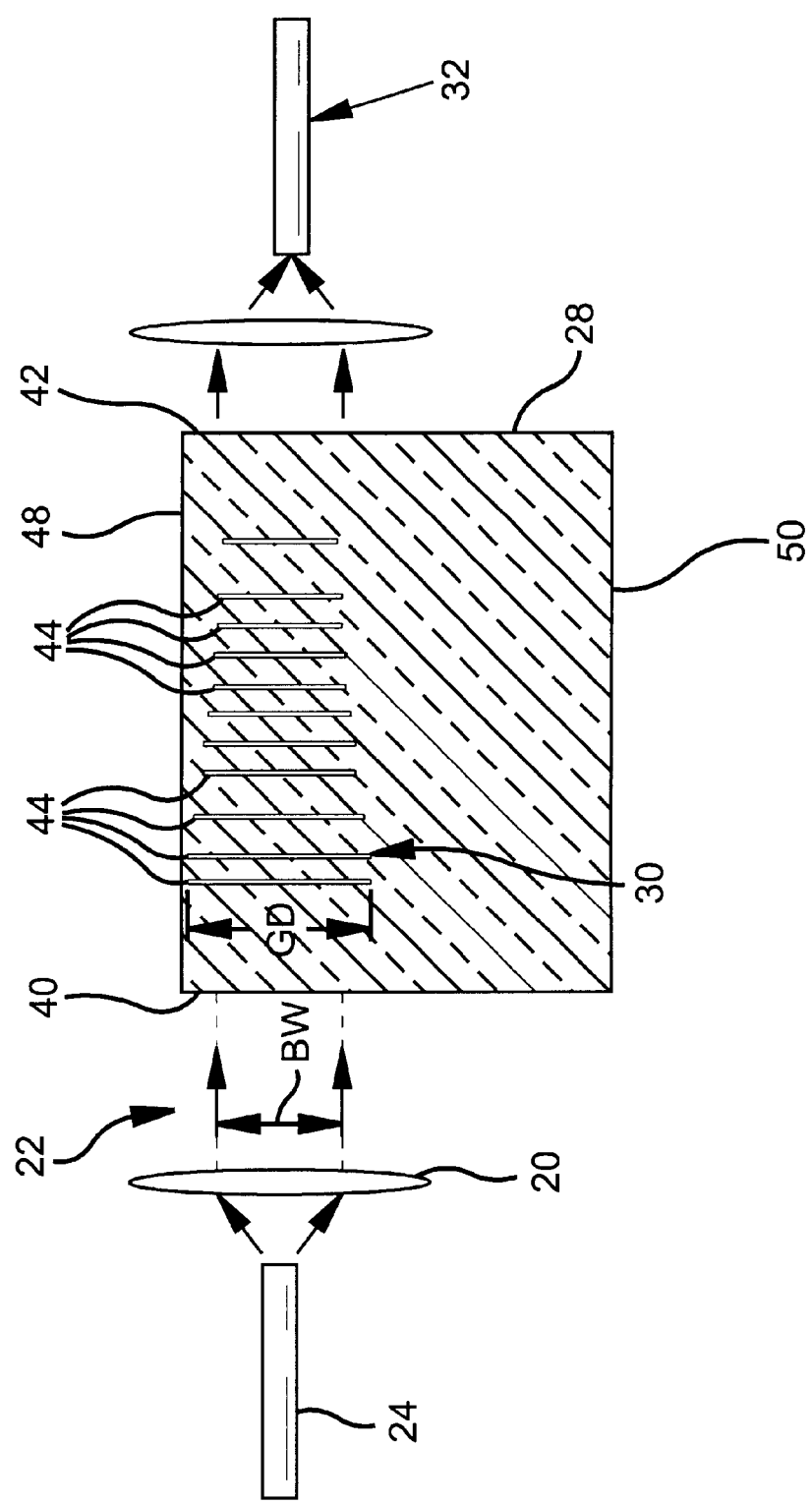
FIG. 6 shows an embodiment of the invention.

As shown in FIG. 5, unguided input light beam 22 has a collimated beam width BW. Internal modulated refractive index grating 30 has a grating depth GD with GD>BW. Preferably the grating depth GD extends from a top surface of bulk grating medium 28, has a first entrance/exit side 40 and an opposing second entrance/exit side 42 with grating 30 comprised of a plurality of photo-induced grating elements 44 which have a progression from first side 40 to second side 42. As shown in FIG. 6, grating medium 28 has a top surface 48 and a bottom surface 50. Unguided input beam 22 has a beam width BW. Photo-induced grating elements 44 have a grating depth length GD in a direction between surface 48 and 50 with GD>BW. Preferably top surface 48 is normal to the first side 40 and second side 42, more preferably with first side 40 parallel to second side 42. Preferably first entrance/exit side 40 is planar and second entrance/exit side 42 is planar. In an alternative embodiment first and/or second entrance/exit sides 40, 42 may include a curved surface. The whole surface of the side can be curved such as a bulk lens element or just part of the side can be a curved surface or multiple curved surfaces such as a lens array. The curved surface can be made from grating medium 28 such as by grinding, finishing, and polishing, or can be a separate optical material that is adhered to the optical grating medium.

Figure 7:
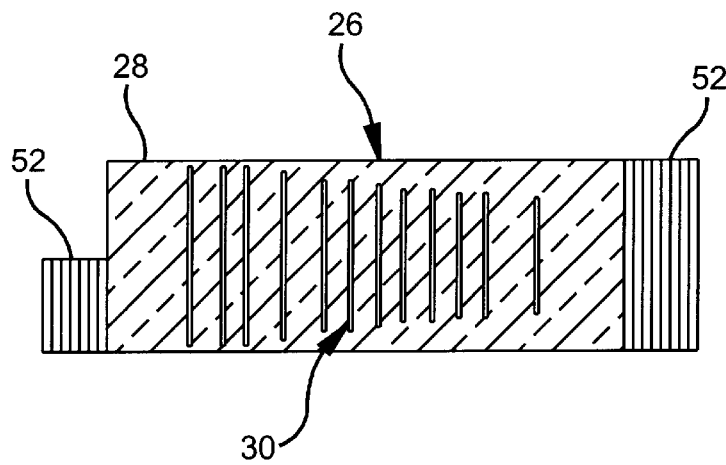
FIG. 7 shows an embodiment of the invention with the bulk optical grating medium including a thin film filter.

In a embodiment of the invention the optical communications wavelength device includes a thin film filter made of a stack of alternating dielectric layers for reflecting/transmitting communications wavelengths. More than one thin film filter can be used with the invention. The thin film filter is positioned in unguided input light beam 22, where the thin film filter can operate on the incident light beam. Preferably the thin filter is positioned after bulk Bragg grating 26. As shown in FIG. 7, thin film filter 52 is deposited on bulk optical grating medium 28. Thin film filter 52 can be deposited on first entrance/exit side 40, with the thin film filter covering the whole side or deposited on just a portion of the side 40. Thin film filter 52 can be deposited on second entrance/exit side 42, with the thin film filter covering the whole side or deposited on just a portion of the side 42. Thin film filters 52 can be deposited on both entrance/exit sides 40 and 42.

Preferably bulk grating 26 is formed from a hydrogen loaded bulk glass 38 where the grating pattern is formed in the bulk glass when the glass contains a sufficient amount of molecular hydrogen, preferably at least $1 \times 10^{18}$ $H_2$ molecules/$cm^3$, and more preferably at least $1 \times 10^{19}$. After grating elements 44 are made in the glass the loaded hydrogen is allowed and promoted to diffuse back out of the glass so that bulk grating 26 is a bulk glass 38 with a diffusion lowered hydrogen level $<10^{18}$ molecules/$cm^3$. Such lowered hydrogen levels are provided by allowing the hydrogen gas to diffuse out such as into a hydrogen depleted or low hydrogen atmosphere.

Figure 8:
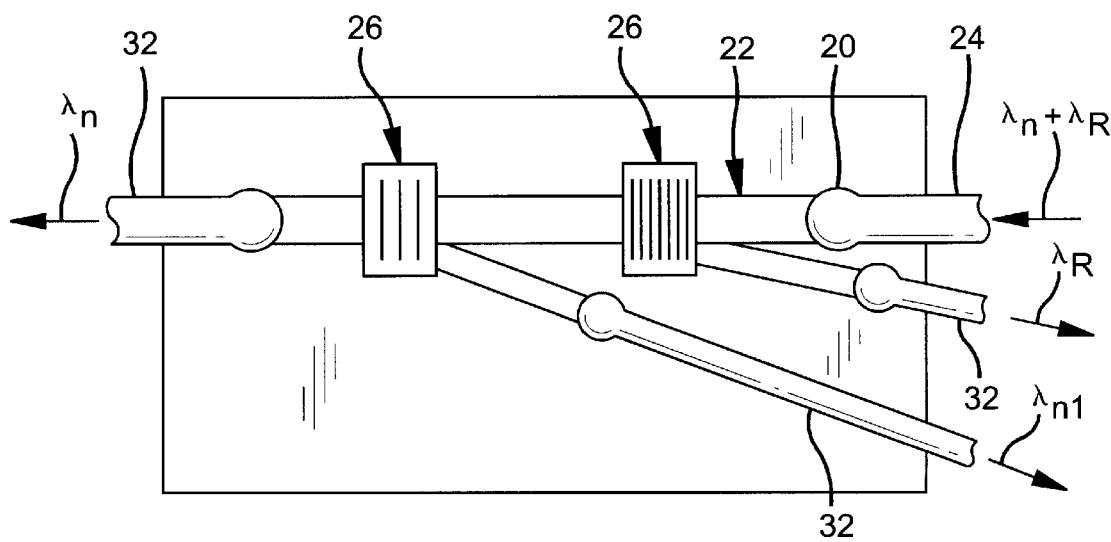
FIG. 8 shows an embodiment of the invention.

As shown in FIG. 8, the inventive bulk grating optical device includes a second bulk internal Bragg grating comprised of a transparent photosensitive bulk optical grating medium including a second internal modulated refractive index grating with a grating pattern for reflecting an at least one transmitted wavelength range band $\lambda_{n1}$, and a second reflected output wavelength range band output coupler. The second reflected output coupler outputs the wavelength range band $\lambda_{n1}$. The second bulk internal Bragg grating is after the $\lambda_R$ reflecting bulk Bragg grating. The second bulk internal Bragg grating is disposed in the unguided input light beam wherein at least one wavelength range band $\lambda_n$ is transmitted through the second bulk Bragg grating and the wavelength range band $\lambda_{n1}$ is reflected by the second bulk Bragg grating to the second reflected output coupler.

Figure 9:
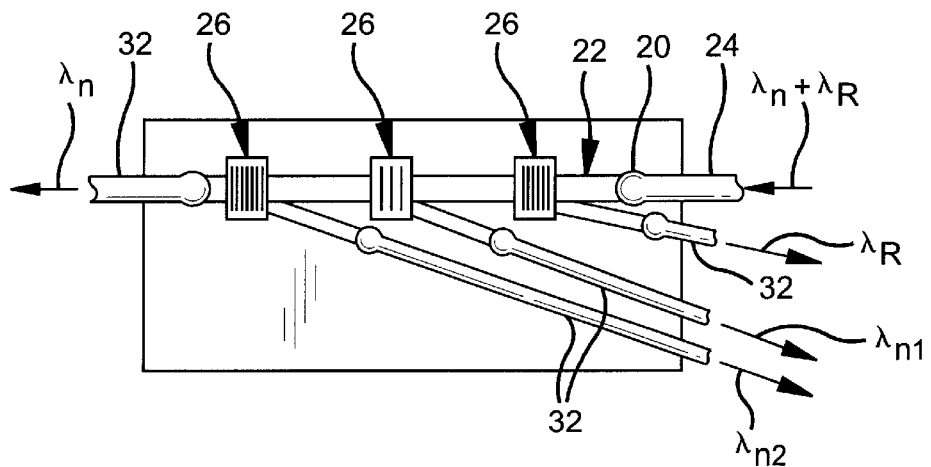
FIG. 9 shows an embodiment of the invention.

As shown in FIG. 9, the inventive bulk grating optical device includes a third bulk internal Bragg grating 26 comprised of a transparent photosensitive bulk optical grating medium including a third internal modulated refractive index grating with a grating pattern for reflecting an at least one transmitted wavelength range band $\lambda_{n2}$, and a third reflected output wavelength range band output coupler. The third reflected output coupler outputs the wavelength range band $\lambda_{n2}$. The third bulk internal Bragg grating is after the second bulk Bragg grating and disposed in the unguided input light beam wherein at least one wavelength range band is transmitted through the third bulk Bragg grating and the wavelength range band $\lambda_{n2}$ is reflected by the third bulk Bragg grating to the third reflected output coupler.

Figure 10:
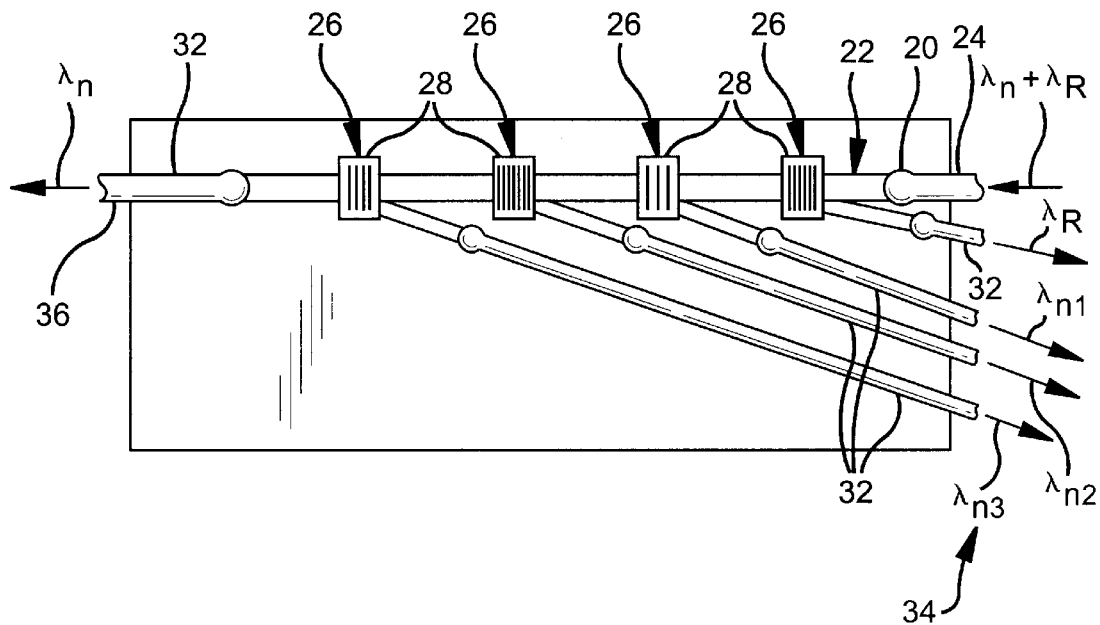
FIG. 10 shows an embodiment of the invention.

As shown in FIG. 10, the bulk grating device includes a fourth bulk internal Bragg grating comprised of a transparent photosensitive bulk optical grating medium including a fourth internal modulated refractive index grating with a grating pattern for reflecting an at least one transmitted wavelength range band $\lambda_{n3}$, and a fourth reflected output wavelength range band output coupler. The fourth reflected output coupler outputs the wavelength range band $\lambda_{n3}$. The fourth bulk internal Bragg grating is after the third bulk Bragg grating. The fourth bulk internal Bragg grating is disposed in the unguided input light beam wherein at least one wavelength range band is transmitted through the fourth bulk Bragg grating and the wavelength range band $\lambda_{n3}$ is reflected by the fourth bulk Bragg grating to the fourth reflected output coupler.

Figure 11:
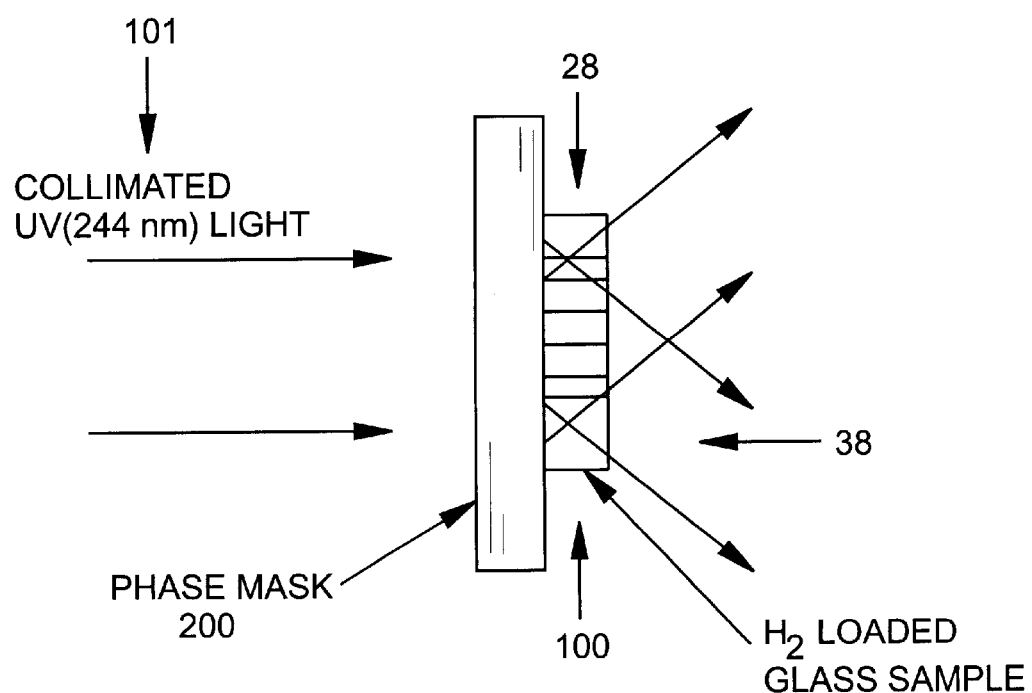
FIG. 11 shows a method in accordance with the invention.
Figure 12:
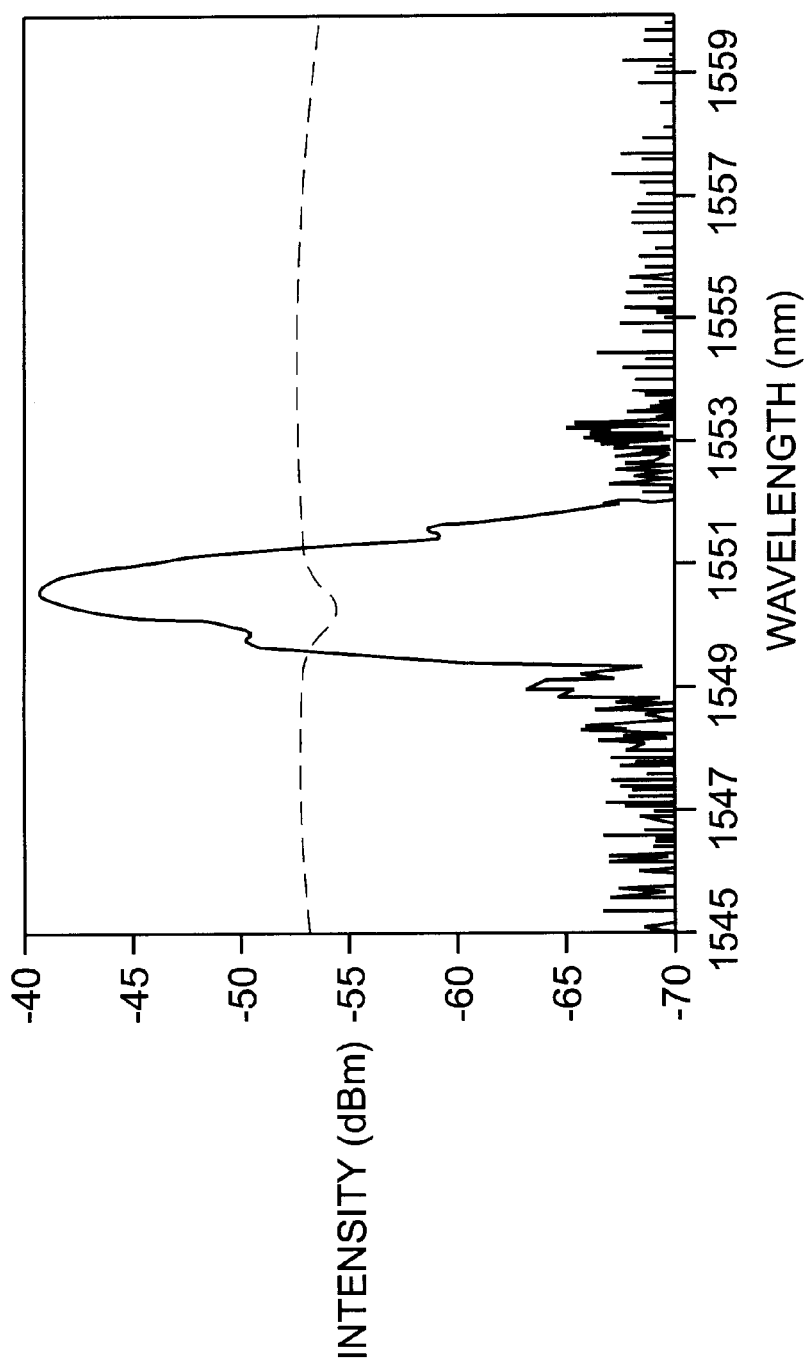
FIG. 12 shows the reflectivity and transmission of a grating in accordance with the invention.

The invention further includes a method of making an optical communications wavelength device, the method comprises providing an input optical waveguide collimator 20 for producing a collimated unguided input light beam path 22 providing a bulk internal Bragg grating 26 in a transparent photosensitive bulk optical grating medium 28 providing a reflected wavelength output coupler 34 and a transmitted wavelength output coupler 36 and securely disposing the provided bulk internal Bragg grating relative to the input optical waveguide collimator, the reflected wavelength output coupler, the transmitted wavelength output coupler, and in the collimated unguided input light beam path wherein a reflected wavelength is reflected by the bulk internal Bragg grating to the reflected wavelength output coupler and a transmitted wavelength is transmitted through the bulk internal Bragg grating and to the transmitted wavelength output coupler. Preferably providing a bulk internal Bragg grating in a transparent photosensitive bulk optical grating medium 28 includes forming a modulated refractive index grating 30 inside the photosensitive bulk optical grating medium 28 with a grating radiation pattern 100. Preferably the grating radiation pattern is an interference pattern and preferably is a mask formed grating pattern. As shown in FIGS. 11–12 preferably the grating pattern is formed from a phase mask and a collimated laser beam. Preferably, providing a bulk internal Bragg grating in a transparent photosensitive bulk optical grating medium 28 includes providing a photosensitive bulk glass 38. Preferably providing a photosensitive bulk glass 38 comprises providing a bulk glass with a 250 nm absorption less than 30 dB/cm, more preferred less than 20 dB/cm, more preferred less than 15 dB/cm, more preferred less than 10 dB/cm, and most preferred a 250 nm absorption less than 5 dB/cm.

Preferably providing a glass comprises providing an alkali boro-alumino-silicate glass, preferably a melted glass containing germanium. Preferably providing the bulk glass comprises providing a melted glass with a melting temperature $\geq 1650°$ C. Preferably providing the bulk glass comprises providing a hydrogen loaded glass. In the preferred embodiment method includes forming the grating radiation pattern 100 with a below 250 nm light 101 Preferably the forming the modulated refractive index grating inside the bulk optical grating medium with a grating radiation pattern 100 includes producing a below 250 nm coherent light beam such as laser light from a continuous wave CW laser having a coherence length >50 microns and forming the grating radiation pattern with the coherent light beam 101.

Preferably producing the coherent light beam producing a coherent light beam with a coherence length $\geq 100$ microns, more preferably $\geq 200$ microns, more preferably $\geq 300$ microns, most preferably $\geq 400$ microns. Preferably as shown in FIGS. 3–6, providing the bulk internal Bragg grating in a transparent photosensitive bulk optical grating medium includes providing a bulk optical grating medium with a first entrance/exit side 40 and an opposing second entrance/exit side 42 with the first entrance/exit side proximate the input collimator and the second entrance/exit side proximate the transmitted wavelength output coupler, with the collimated unguided input light beam path having a beam width BW, the first side 40 having a first side depth height FSH and the second side 42 having a second side depth height SSH, with FSH>BW and SSH>BW.

Preferably the bulk internal Bragg grating has a grating depth height GD, wherein forming the grating includes producing a below 250 nm coherent light beam 101 having a coherence length CL with CL>GD. Preferably GD>BW, GD<FSH or SSH. More preferably the bulk internal Bragg grating has a grating depth height GD, wherein forming the grating includes producing a below 250 nm coherent light beam 101 having a coherence length CL with CL$\geq$2 GD. Preferably the bulk optical grating medium includes a grating formation coherent light entrance surface top 48 normal to the first entrance/exit side 40 with the method including providing a grating phase mask 200, positioning the phase mask proximate and adjacent the grating formation coherent light entrance surface 48, and transmitting the coherent light beam 101 through the mask 200 and into the bulk optical grating medium 28. Preferably providing the bulk internal Bragg grating 28 includes providing a bulk optical grating medium 28 with a first entrance/exit side 40 and an opposing second entrance/exit side 42, a first grating formation coherent light entrance surface 48 and an opposing second grating formation coherent light entrance surface 50. The first and second grating formation coherent light entrance surfaces are preferably normal to the first entrance/exit side. This embodiment includes providing a multi-mask grating former 500 which includes a first grating phase mask 200 and an opposing second grating phase mask 201 aligned with the first phase mask 200, positioning the first grating phase mask proximate the first grating formation coherent light entrance surface 48 and the second grating phase mask 201 proximate the second grating formation coherent light entrance surface 50, producing a first coherent light beam 101 and transmitting the first coherent light beam through the first mask 200 and into the bulk optical grating medium and producing a second coherent light beam 101 and transmitting the second coherent light beam 101 through the second mask 201 and into the bulk optical grating medium to form the grating pattern and the bulk grating.

As shown in FIG. 8, the method includes providing a second bulk internal Bragg grating in a transparent photosensitive bulk optical grating medium for reflecting a second reflect wavelength, and providing a second reflected wavelength output coupler, and securely disposing the provided second bulk internal Bragg grating between the bulk internal Bragg grating and the transmitted wavelength output coupler and in the collimated unguided input light beam path, and relative to the provided second reflected wavelength output coupler wherein the second reflect wavelength is reflected by the second bulk internal Bragg grating to the second reflected wavelength output coupler and a transmitted wavelength is transmitted through the second bulk internal Bragg grating and towards the transmitted wavelength output coupler.

As shown in FIG. 9, the method includes providing a third bulk internal Bragg grating in a transparent photosensitive bulk optical grating medium for reflecting a third reflect wavelength, and providing a third reflected wavelength output coupler, and securely disposing the provided third bulk internal Bragg grating between the second bulk internal Bragg grating and the transmitted wavelength output coupler and in the collimated unguided input light beam path, and relative to the provided third reflected wavelength output coupler wherein the third reflect wavelength is reflected by the third bulk internal Bragg grating to the third reflected wavelength output coupler and a transmitted wavelength is transmitted through the third bulk internal Bragg grating and towards the transmitted wavelength output coupler.

As shown in FIG. 10, the method includes providing a fourth bulk internal Bragg grating in a transparent photosensitive bulk optical grating medium for reflecting a fourth reflect wavelength and providing a fourth reflected wavelength output coupler and securely disposing the provided fourth bulk internal Bragg grating between the third bulk internal Bragg grating and the transmitted wavelength output coupler and in the collimated unguided input light beam path, and relative to the provided fourth reflected wavelength output coupler wherein the fourth reflect wavelength is reflected by the fourth bulk internal Bragg grating to the fourth reflected wavelength output coupler and a transmitted wavelength is transmitted through the fourth bulk internal Bragg grating and towards the transmitted wavelength output coupler.

In an embodiment the method includes providing a thin film filter 52 the thin film filter comprised of a stack of alternating dielectric layers, and disposing the thin film filter in the collimated unguided input light beam 22. As shown in FIG. 7 the thin film filter is preferably attached to bulk grating 26, preferably with filter 52 formed and directly deposited on grating 26. Alternatively filter 52 can be physically separate, grating 26.

In a preferred embodiment the method includes depositing a thin film filter alternating dielectric layers stack on the transparent bulk optical grating medium. Preferably the method includes loading the bulk glass 38 with molecular hydrogen, and inhibiting the diffusion of loaded molecular hydrogen out of the bulk glass 38 and forming a modulated refractive index grating inside the molecular hydrogen bulk glass with a grating radiation pattern 100. Preferably this is followed by diffusing the loaded molecular hydrogen out of the bulk glass 38 after forming the modulated refractive index grating 30.

In a further embodiment the invention includes an optical communications planar integrated waveguide circuit device 600 for operating on communications wavelengths including at least one reflectable wavelength, the planar device 600 comprising a planar waveguide substrate 601 supporting a waveguiding integrated circuit core 602 and a waveguiding integrated circuit cladding 603 covering the core 602. The planar waveguide substrate 601 is a transparent photosensitive bulk optical grating medium 28, the transparent photosensitive bulk optical grating medium 28 containing within it a bulk Bragg internal modulated refractive index grating 606 with a grating pattern for reflecting at least one reflectable wavelength, the refractive index grating is proximate and adjacent to the core 602 wherein a reflectable wavelength guided by the core is reflected by the refractive index grating. FIGS. 15, 15a, 16, 16a show embodiments of the planar device 600 with FIG. 15a being a cross section view and FIG. 16a being a cross section view.

Preferably the transparent photosensitive bulk optical grating medium planar substrate 601 comprises a photosensitive bulk glass 38. Preferably bulk glass planar substrate 601 is a melted alkali boro-alumino-silicate glass.

In embodiments of the invention the grating pattern is in a selected portion of the substrate preferably with a plurality of grating patterns, and alternatively the grating pattern can be over the entire surface. Preferably the substrate includes at least a second grating pattern for reflecting at least a second reflectable wavelength guided by the core.

The invention further includes a method of making an optical planar integrated waveguide circuit 600. The method includes providing a transparent photosensitive bulk optical grating medium planar waveguide substrate 601 having a near core side 650 forming a waveguiding integrated circuit core 602 cladding the core with a cladding 603, and forming a bulk Bragg internal modulated refractive index grating 606 in the transparent photosensitive bulk optical grating medium planar waveguide substrate 601 proximate the near core side 650 wherein a waveguided wavelength guided by the core 602 is manipulated by the refractive index grating 606.

Preferably the method comprises providing a photosensitive bulk glass 38 preferably wherein providing the photosensitive bulk glass 38 comprises providing a melted alkali boroalumino-silicate glass.

Figure 17:
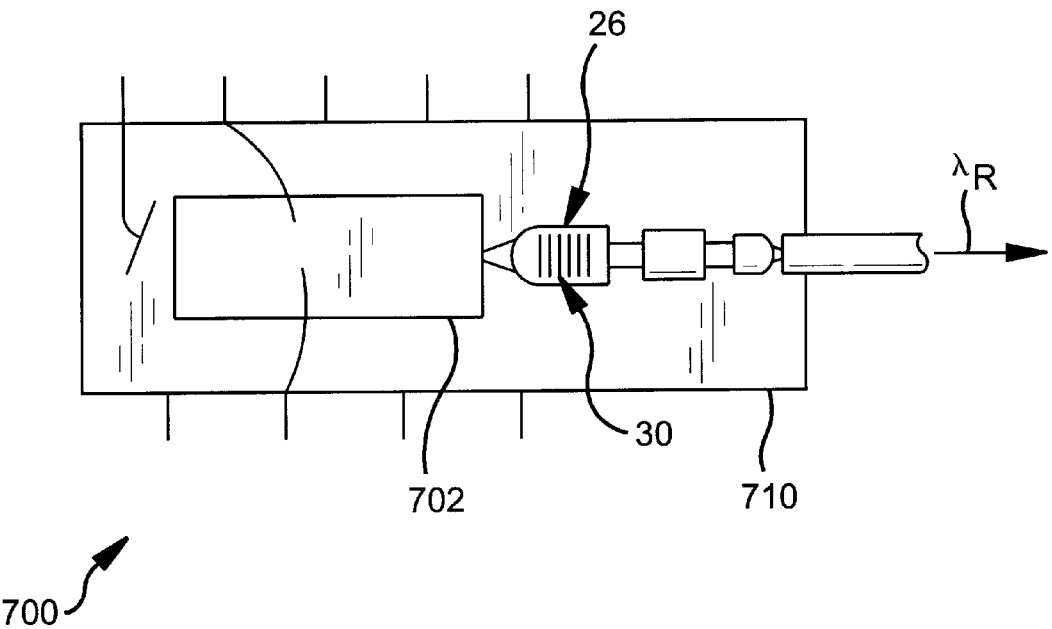
FIGS. 17 and 17a show an embodiment of the invention.
Figure 17A:
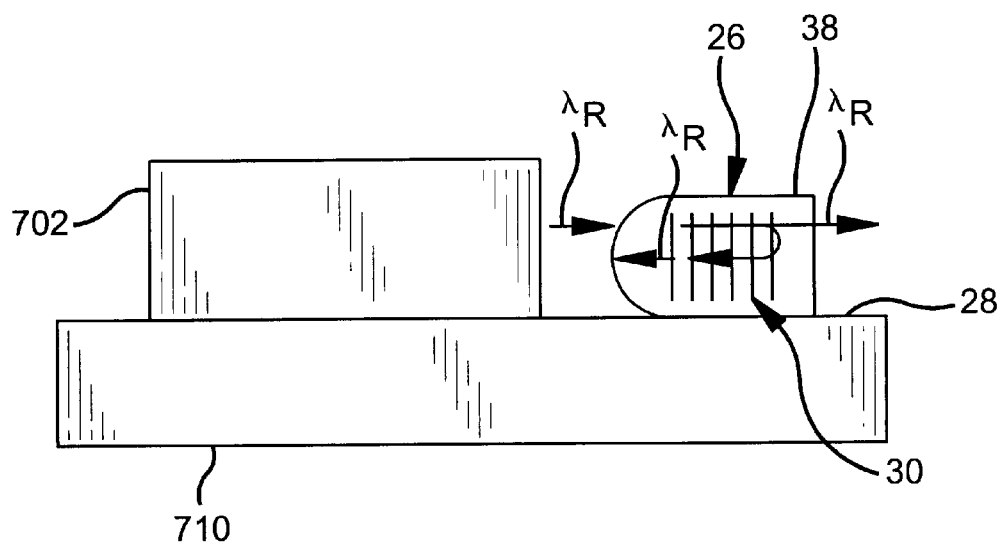
Figure 18:
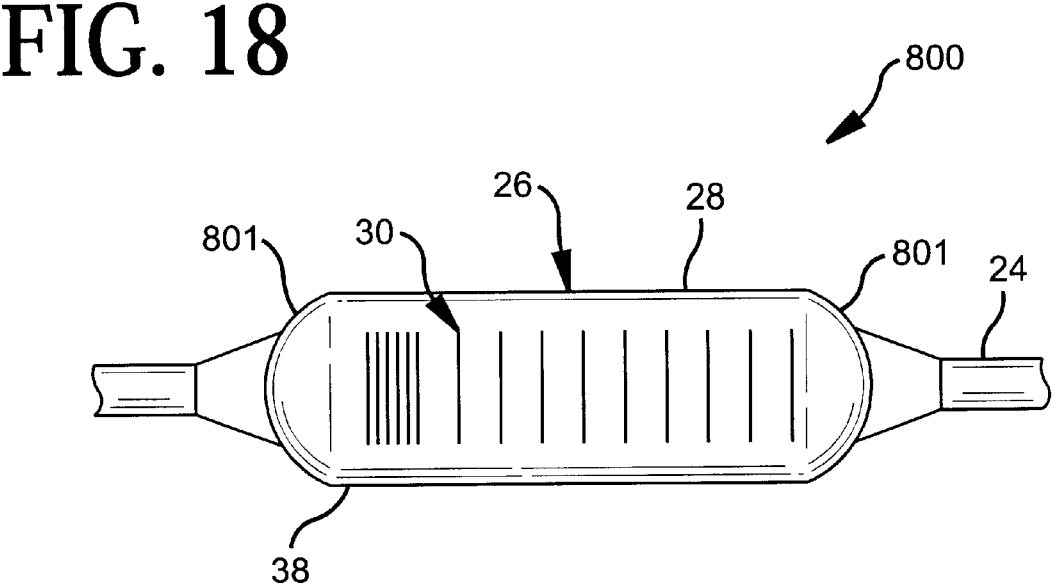
FIGS. 18 and 18a show an embodiment of the invention.
Figure 18A:
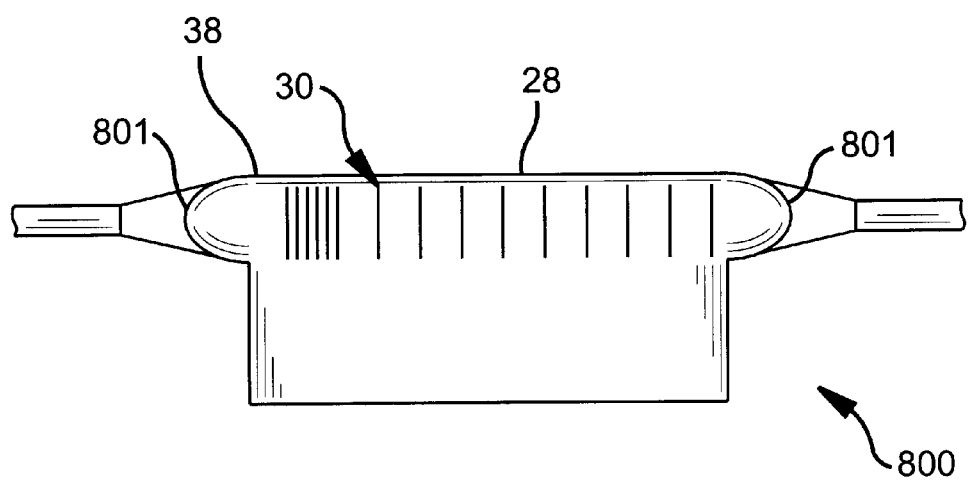

The invention includes an optical waveguide semiconductor laser device 700 for an optical waveguide communications system, an embodiment of which is shown in FIGS. 17–17a. In an embodiment the laser device is a pump laser. In another embodiment the laser device is a signal laser. The semiconductor laser device 700 includes an optical waveguide system semiconductor laser 702 for producing a reflectable wavelength $\lambda_R$ utilized in an optical waveguide system, a bulk internal Bragg laser grating 26, the bulk Bragg laser grating 26 comprised of a transparent photosensitive bulk optical grating medium 28 including an internal modulated refractive index grating 30 with a grating period for reflecting the wavelength $\lambda_R$, and a substrate structure 710 for securing the bulk Bragg laser grating 26 relative to the semiconductor laser 702 wherein the wavelength $\lambda_R$ produced by the semiconductor laser is reflected by the bulk internal Bragg laser grating 26 back into the semiconductor laser 702. Preferably the transparent photosensitive bulk optical grating medium 28 comprises a photosensitive bulk glass 39, preferably wherein the bulk glass comprises an alkali boro-alumino-silicate glass. Such a device 700 produces a beneficial laser output centered about $\lambda_R$ since $\lambda_R$ is fed back into the laser by grating 26. Preferably the Bragg laser grating has an optical element shape and optical surface for manipulating the light. Preferably the grating includes a curved surface and comprises a lens.

The invention includes a method of making an optical waveguide semiconductor laser device 700. The method includes providing a bulk internal Bragg laser grating 26 in a transparent photosensitive bulk optical grating medium 28 and providing an optical waveguide system semiconductor laser 702 and securely disposing the bulk optical grating medium 28 relative to the semiconductor laser 702 wherein a wavelength produced by the semiconductor laser 702 is reflected by the bulk internal Bragg laser grating 26 back into the semiconductor laser 702.

Preferably the method includes providing the bulk internal Bragg laser grating in a transparent photosensitive bulk optical grating medium comprises providing a photosensitive bulk glass 38, preferably with the photosensitive bulk glass comprising a melted alkali boro-alumino-silicate glass.

Figure 19:
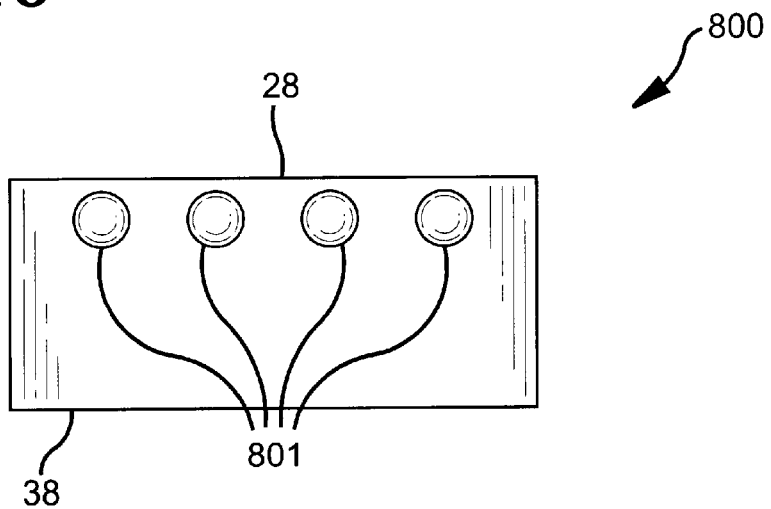
FIGS. 19 and 19a shown an embodiment of the invention.
Figure 19A:
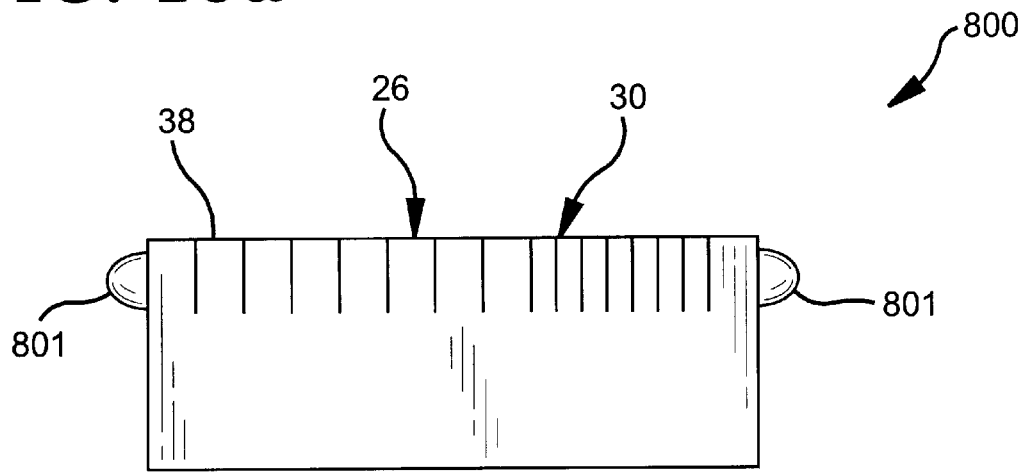
Figure 20:
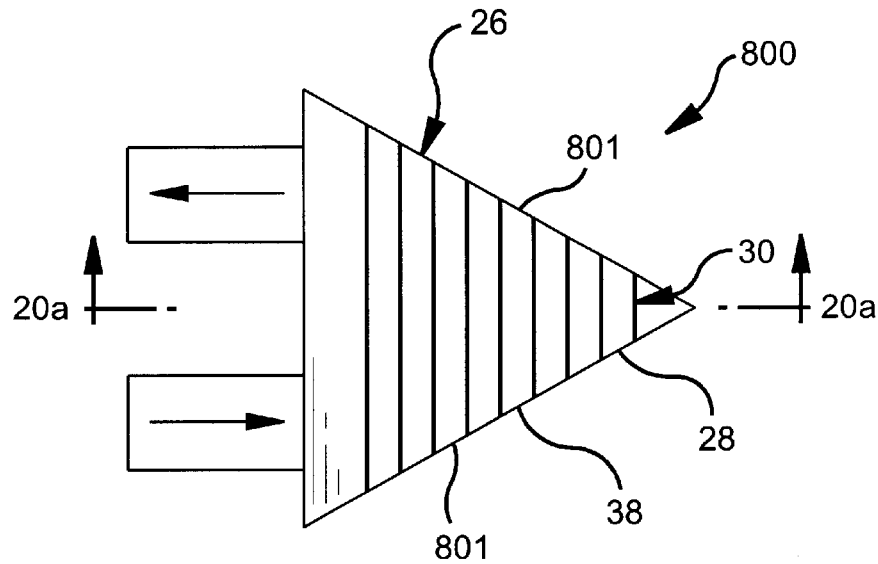
FIGS. 20 and 20a show an embodiment of the invention.
Figure 20A:
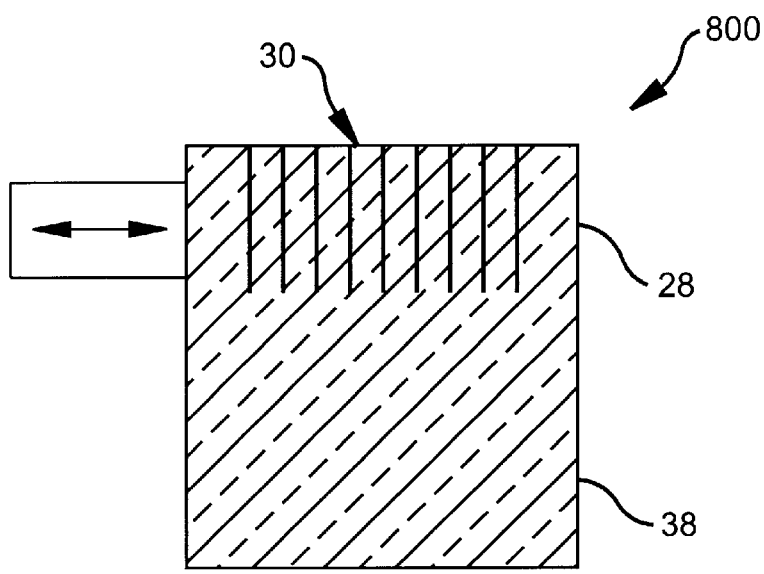

As shown in FIGS. 18–20a, the invention further includes an optical communications wavelength optical element 800 for operating on light range bands, the optical element 800 comprised of a transparent photosensitive bulk optical grating medium 28 photosensitive bulk glass 38, the optical element having at least one optical element optical surface 801 for manipulating light, the bulk glass 38 including an internal modulated refractive index Bragg grating pattern for reflecting at least one wavelength range band. Preferably the optical element optical surface 801 comprises a curved surface. In a preferred alternative the optical element optical surface 801 comprises a total internal reflecting surface, preferably a flat surface, with the optical element 800 being a prism as shown in FIGS. 20–20a. As shown in FIGS. 18, 18a, 19, 19a the curved surface 801 comprises a lens. As shown in FIGS. 19–19a the element includes a lens array with a plurality of lenses utilizing the reflectance of grating 30. The optical element optical surfaces 801 are preferably formed from the bulk glass such as ground, pressed or shaped surfaces in medium 28. Alternatively the optical element optical surfaces 801 are comprised of a transparent optical material attached and adhered to the glass medium 28.

Figure 13:
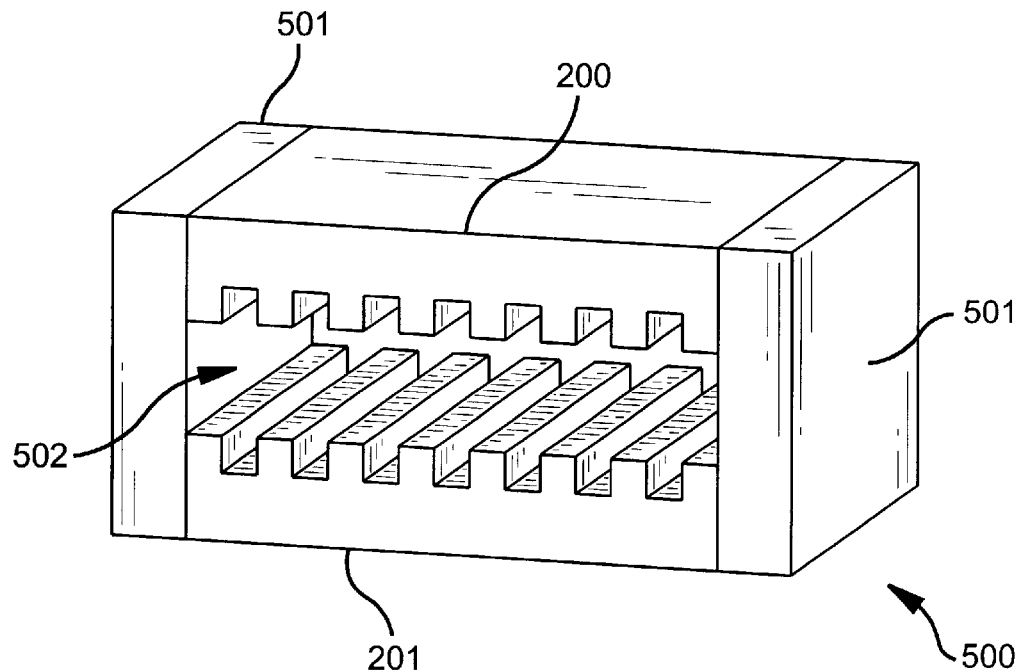
FIG. 13 shows a multi-mask grating former in accordance with the invention.
Figure 14:
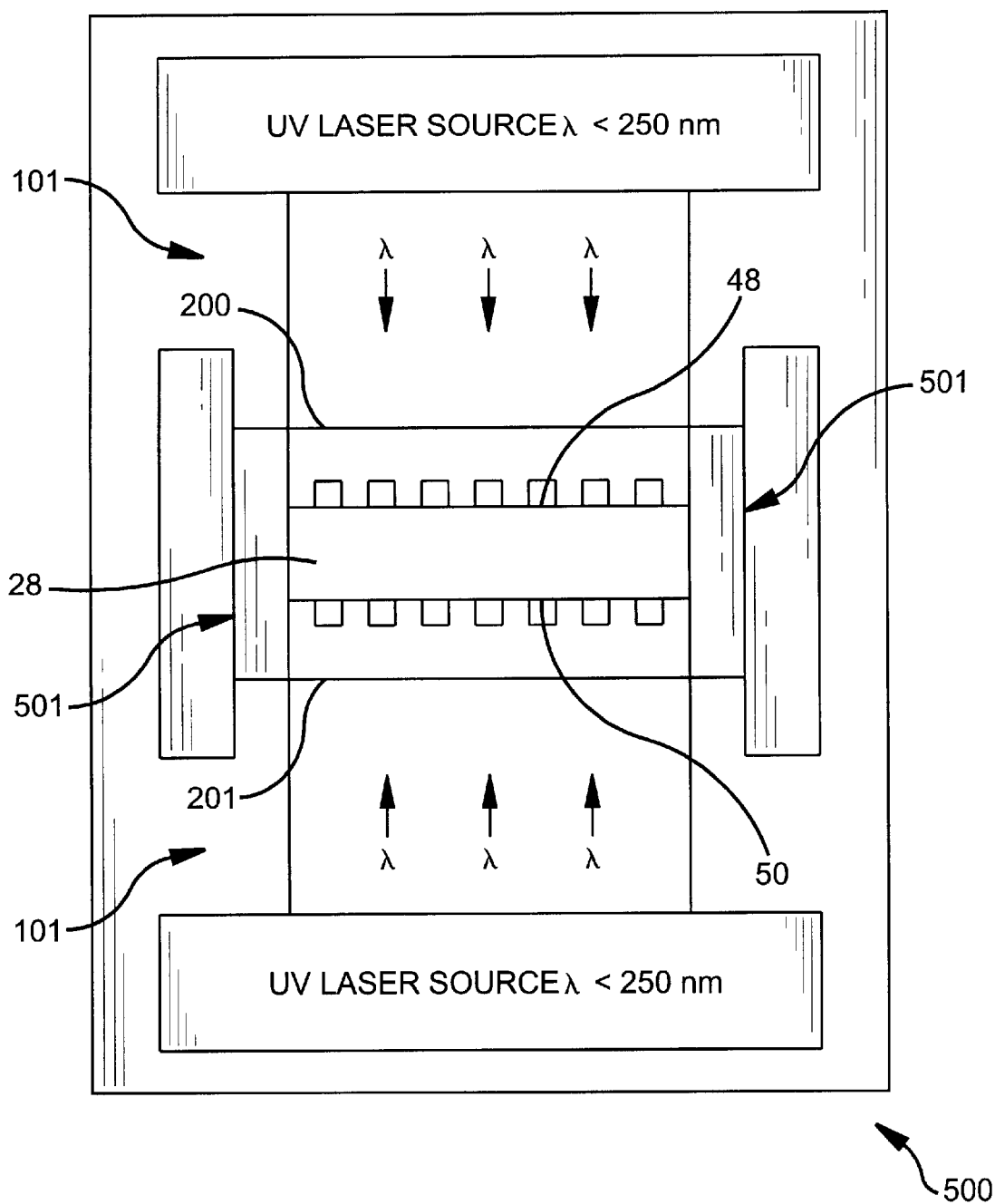
FIG. 14 shows a method in accordance with the invention.
Figure 15:
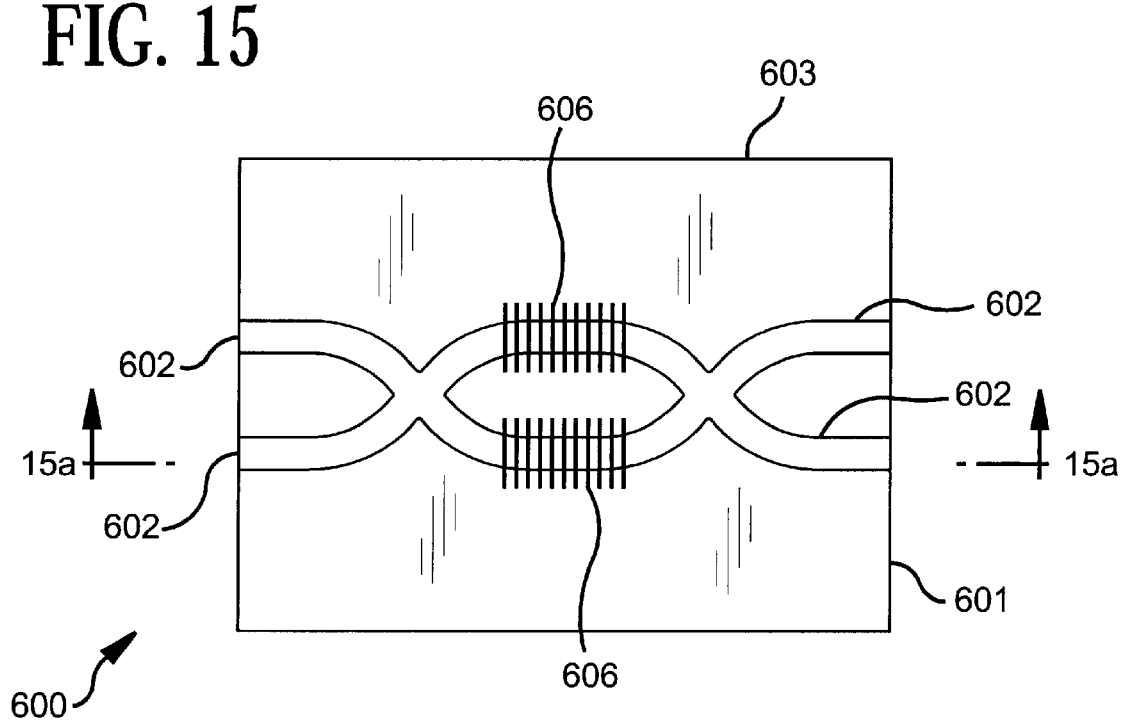
FIGS. 15 and 15a (cross section view) show an embodiment of the invention.
Figure 15A:
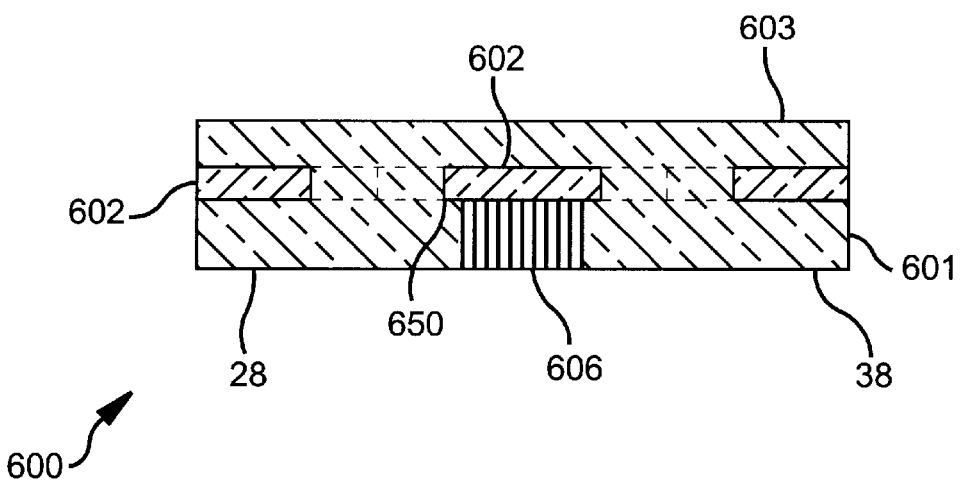
Figure 16:
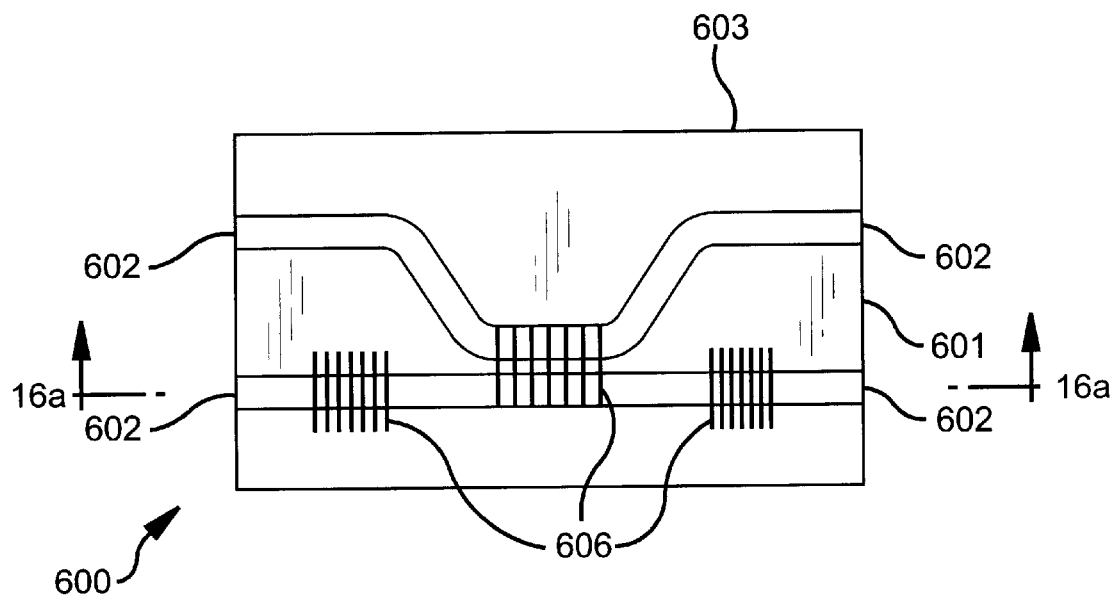
FIGS. 16 and 16a (cross section view) show an embodiment of the ivention.
Figure 16A:
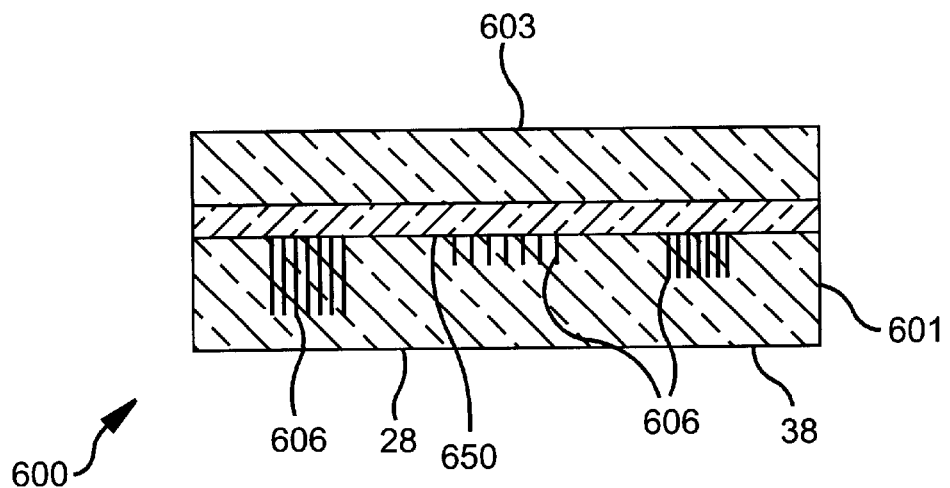

As shown in FIGS. 13–14, the invention includes a multi-mask grating former 500, the grating former 500 comprised of a first grating phase mask 200 and an opposing second grating phase mask 201 and a phase mask spacing structure 501, the phase mask spacing structure 501 securing the first phase mask away from the second phase mask to provide a photosensitive optical grating medium receiver space 502 for reception of a photosensitive optical grating medium 28 between the first and second masks with the first phase mask 200 in alignment with the second phase mask 201.

The invention includes a method of making an optical waveguide communications wavelength device. The method comprises providing an input optical waveguide collimator for producing a collimated unguided input light beam path from an optical waveguide, providing a bulk internal Bragg grating in a transparent photosensitive bulk optical grating medium, providing a wavelength output waveguide coupler, and securely disposing the provided bulk internal Bragg grating relative to the input optical waveguide collimator, the output coupler, and in the collimated unguided input light beam path wherein a reflected wavelength is reflected by the bulk internal Bragg grating and a transmitted wavelength is transmitted through the bulk internal Bragg grating.

EXAMPLES

Figure 12A:
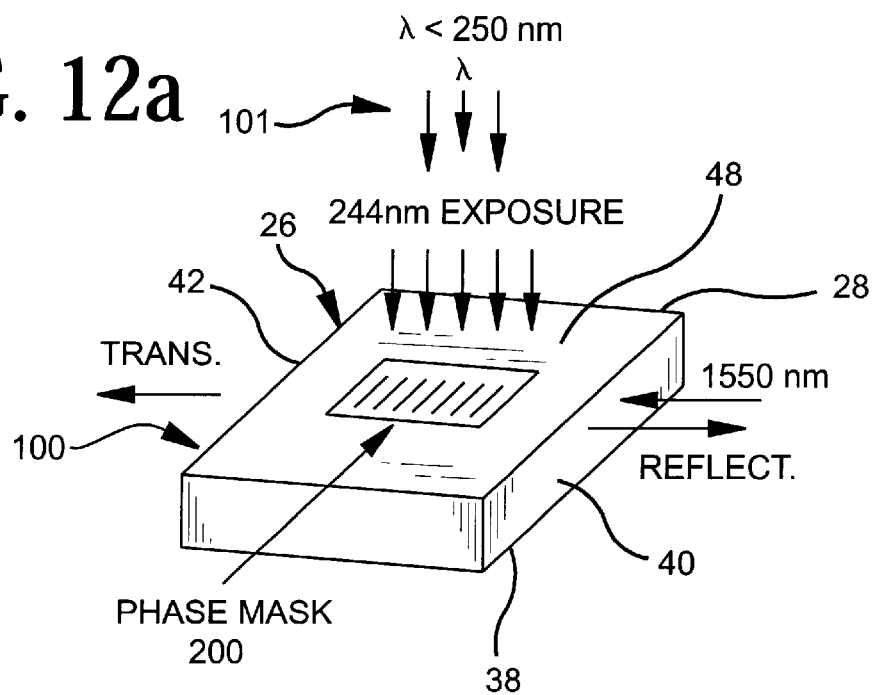
FIG. 12a shows a method in accordance with the invention and the geometry of the exposure and reflectivity/transmission measurements of FIG. 12.

As shown in FIGS. 11–12a, bulk Bragg gratings were made with alkali boro-alumino-silicate germanium photosensitive bulk glass samples loaded with hydrogen. Bulk glass samples in the shape of rectangular blocks were utilized. As shown in FIG. 12a, a bulk glass sample of Glass 5 g of cross-referenced Patent Application UV Photosensitive Melted Germano-Silicate Glasses (51 mole % $SiO_2$, 7.5 mole % $GeO_2$, 2.6% mole % $LiO_2$, 3.2 mole % $Al_2O_3$, and 35.1 mole % $B_2O_3$) was exposed through the wide face using a 244-nm CW laser (0.35 W for 30–60 minutes) utilizing a phase mask with a period such as to satisfy the Bragg condition at 1550-nm to produce a refractive index pattern. The grating length was 2.5-mm. The reflectivity and transmission of the grating is shown in FIG. 12. FIG. 12a shows the geometry of the exposure and the reflectivity and transmission measurement. From the grating transmission measurement (1.5–2 db decrease corresponding to 30–40% reflectivity in the 2.5-mm long grating), a modulated refractive index change of $0.12-0.14 \times 10^{-3}$ is calculated at 1550-nm. FIG. 21 shows a reflection spectrum of a grating in accordance with the invention.

The bulk gratings of the invention preferably have a reflectivity of at least 25%, more preferably at least 50%, and most preferably at least 99.9%. Preferably the grating reflect telecommunications utilized wavelengths >900 nm, more preferred >1200 nm, more preferred >1400 nm, and most preferably >1500 such as the 1550 nm range. The bulk gratings advantageously are free of cladding modes. Preferably the bulk Bragg gratings have channel spacings as small as 50 GHz or even smaller.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. An optical communications wavelength device for use with wavelength range bands, said device comprising:
    an input optical waveguide collimator, said input optical waveguide collimator collimating an input light beam out of an optical waveguide to provide an unguided input light beam including at least one reflective wavelength range band $\lambda_R$ and at least one wavelengths range band $\lambda_n$,
    a bulk internal Bragg grating, said bulk Bragg grating comprised of a transparent photosensitive bulk optical grating medium including an internal modulated refractive index grating with a grating pattern for reflecting said at least one wavelength range band $\lambda_R$,
    at least one output coupler, said output coupler for at least one output wavelength range band,
    a substrate structure for securing said bulk Bragg grating relative to said input collimator and said output coupler, said bulk Bragg grating disposed in said unguided input light beam wherein said at least one wavelengths range band $\lambda_n$ is transmitted through said bulk Bragg grating and said at least one wavelength range band $\lambda_R$ is reflected by said bulk Bragg grating, said device including a thin film filter, said thin film filter comprised of a stack of alternating dielectric layers for reflecting/transmitting communications wavelengths.

2. An optical device as claimed in claim 1, said thin film filter positioned in said unguided input light beam after said bulk Bragg grating.

3. An optical device as claimed in claim 1, wherein said thin film filter is deposited on said bulk optical grating medium.

4. An optical communications wavelength device for use with wavelength range bands, said device comprising:
    an input optical waveguide collimator, said input optical waveguide collimator collimating an input light beam out of an optical waveguide to provide an unguided input light beam including at least one reflective wavelength range band $\lambda_R$ and at least one wavelengths range band $\lambda_n$,
    a bulk internal Bragg grating, said bulk Bragg grating comprised of a transparent photosensitive bulk optical grating medium including an internal modulated refractive index grating with a grating pattern for reflecting said at least one wavelength range band $\lambda_R$, said bulk grating medium having a first entrance/exit side and an second entrance/exit side, said internal modulated refractive index grating comprised of a plurality of photo-induced grating elements which have a progression from said first side to said second side, said bulk internal Bragg grating having a thin film filter alternating dielectric layer stack deposited on said first entrance/exit side,
    at least one output coupler, said output coupler for at least one output wavelength range band,
    a substrate structure for securing said bulk Bragg grating relative to said input collimator and said output coupler, said bulk Bragg grating disposed in said unguided input light beam wherein said at least one wavelengths range band $\lambda_n$ is transmitted through said bulk Bragg grating and said at least one wavelength range band $\lambda_R$ is reflected by said bulk Bragg grating.

5. An optical device as claimed in claim 4, said thin film filter deposited on a portion of said first side.

6. An optical device as claimed in claim 4, said thin film filter covering said first side.

7. An optical device as claimed in claim 4, said device including a second thin film filter deposited on said second entrance/exit side.

8. An optical communications wavelength device for use with wavelength range bands, said device comprising:
    an input optical waveguide collimator, said input optical waveguide collimator collimating an input light beam out of an optical waveguide to provide an unguided input light beam including at least one reflective wavelength range band $\lambda_R$ and at least one wavelengths range band $\lambda_n$,
    a bulk internal Bragg grating, said bulk Bragg grating comprised of a transparent photosensitive bulk optical grating medium including an internal modulated refractive index grating with a grating pattern for reflecting said at least one wavelength range band $\lambda_R$, said bulk grating medium having a first entrance/exit side and an second entrance/exit side, said internal modulated refractive index grating comprised of a plurality of photo-induced grating elements which have a progression from said first side to said second side, said bulk internal Bragg grating having a thin film filter alternating dielectric layer stack deposited on said second entrance/exit side, at least one output coupler, said output coupler for at least one output wavelength range band, a substrate structure for securing said bulk Bragg grating relative to said input collimator and said output coupler, said bulk Bragg grating disposed in said unguided input light beam wherein said at least one wavelengths range band $\lambda_n$ is transmitted through said bulk Bragg grating and said at least one wavelength range band $\lambda_R$ is reflected by said bulk Bragg grating.

9. An optical device as claimed in claim 8, said thin film filter deposited on a portion of said second side.

10. An optical device as claimed in claim 8, said thin film filter covering said second side.

11. A method of making an optical communications wavelength device, said method comprising:

providing an input optical waveguide collimator for producing a collimated unguided input light beam path, providing a bulk internal Bragg grating in a transparent photosensitive bulk optical grating medium, wherein providing a bulk internal Bragg grating in a transparent photosensitive bulk optical grating medium includes providing a bulk optical grating medium with a first entrance/exit side and an opposing second entrance/exit side, a first grating formation coherent light entrance surface and an opposing second grating formation coherent light entrance surface said first and second grating formation coherent light entrance surfaces normal to said first entrance/exit side, providing a multi-mask grating former which includes a first grating phase mask and an opposing second grating phase mask aligned with said first phase mask, positioning said first grating phase mask proximate said first grating formation coherent light entrance surface and said second grating phase mask proximate said second grating formation coherent light entrance surface, producing a first coherent light beam and transmitting said first coherent light beam through said first mask and into said bulk optical grating medium and producing a second coherent light beam and transmitting said second coherent light beam through said second mask and into said bulk optical grating medium, providing a reflected wavelength output coupler and a transmitted wavelength output coupler, securely disposing said provided bulk internal Bragg grating relative to said input optical waveguide collimator, said reflected wavelength output coupler, said transmitted wavelength output coupler, and in the collimated unguided input light beam path wherein a reflected wavelength is reflected by said bulk internal Bragg grating to said reflected wavelength output coupler and a transmitted wavelength is transmitted through said bulk internal Bragg grating and to said transmitted wavelength output coupler.

12. A method of making an optical communications wavelength device, said method comprising:

providing an input optical waveguide collimator for producing a collimated unguided input light beam path, providing a bulk internal Bragg grating in a transparent photosensitive bulk optical grating medium, providing a reflected wavelength output coupler and a transmitted wavelength output coupler, providing a thin film filter, said thin film filter comprised of a stack of alternating dielectric layers, disposing said thin film filter in said collimated unguided input light beam and securely disposing said provided bulk internal Bragg grating relative to said input optical waveguide collimator, said reflected wavelength output coupler, said transmitted wavelength output coupler, and in the collimated unguided input light beam path wherein a reflected wavelength is reflected by said bulk internal Bragg grating to said reflected wavelength output coupler and a transmitted wavelength is transmitted through said bulk internal Bragg grating and to said transmitted wavelength output coupler.

13. A method of making an optical communications wavelength device, said method comprising:

providing an input optical waveguide collimator for producing a collimated unguided input light beam path, providing a bulk internal Bragg grating in a transparent photosensitive bulk optical grating medium, depositing a thin film filter alternating dielectric layers stack on said transparent bulk optical grating medium providing a reflected wavelength output coupler and a transmitted wavelength output coupler, securely disposing said provided bulk internal Bragg grating relative to said input optical waveguide collimator, said reflected wavelength output coupler, said transmitted wavelength output coupler, and in the collimated unguided input light beam path wherein a reflected wavelength is reflected by said bulk internal Bragg grating to said reflected wavelength output coupler and a transmitted wavelength is transmitted through said bulk internal Bragg grating and to said transmitted wavelength output coupler.

* * * * *